United States Patent [19]

Billieres

[11] Patent Number: 5,700,339

[45] Date of Patent: Dec. 23, 1997

[54] PROCESS FOR THE MANUFACTURE OF A TIRE HAVING A CARCASS REINFORCEMENT WHICH IS FORMED OF AT LEAST ONE PLY OF CORDS OR CABLES

[75] Inventor: Jean Billieres, Clermont-Ferrand, France

[73] Assignee: Compagnie Generale des Etablissements Michelin - MICHELIN & CIE, Clermont-Ferrand Cedex, France

[21] Appl. No.: 569,103

[22] PCT Filed: Jun. 7, 1994

[86] PCT No.: PCT/EP94/01841

§ 371 Date: Dec. 21, 1995

§ 102(e) Date: Dec. 21, 1995

[87] PCT Pub. No.: WO95/00322

PCT Pub. Date: Jan. 5, 1995

[30] Foreign Application Priority Data

Jun. 25, 1993 [FR] France ................... 93 07879

[51] Int. Cl.$^6$ .................................................. B29D 30/16
[52] U.S. Cl. ................... 156/117; 156/123; 156/126; 156/130.7; 156/133; 156/406.2
[58] Field of Search ................ 156/406.2, 405.1, 156/117, 122, 123, 125, 126, 127, 130, 130.7, 133, 134, 135, 400, 394.1; 152/548

[56] References Cited

U.S. PATENT DOCUMENTS

| 1,316,104 | 9/1919 | Nall . |
| 3,218,209 | 11/1965 | Travers et al. . |
| 3,776,792 | 12/1973 | Grawey . |
| 3,895,985 | 7/1975 | Schelkmann .................. 156/406.2 |
| 3,975,490 | 8/1976 | Lapeyre . |
| 4,983,239 | 1/1991 | Holroyd et al. .................. 156/126 |
| 5,171,394 | 12/1992 | Laurent . |

FOREIGN PATENT DOCUMENTS

| 0481805 | 4/1992 | European Pat. Off. . |
| 1214908 | 9/1957 | France . |
| 1579162 | 1/1970 | Germany . |
| 1934018 | 1/1971 | Germany . |
| 2064753 | 7/1972 | Germany . |

Primary Examiner—Geoffrey L. Knable
Attorney, Agent, or Firm—Brumbaugh, Graves, Donohue & Raymond

[57] ABSTRACT

A process for the manufacture of a tire which consists of producing a toroidal carcass reinforcement blank (1) by the helical winding of a cord or cable around a non-deformable, annular building core N, followed by at least one circumferential cut on the radially inner surface of the core N and a cut on the radially outer surface, the two halves of the blank being then separated axially to permit the removal of the core and subsequently brought together and connected for the finishing of the blank of the tire.

11 Claims, 5 Drawing Sheets

PROCESS FOR THE MANUFACTURE OF A TIRE HAVING A CARCASS REINFORCEMENT WHICH IS FORMED OF AT LEAST ONE PLY OF CORDS OR CABLES

The present invention relates to a process for the manufacture of a tire having at least one carcass reinforcement which is formed of plies of cords or cables and, more particularly, a process for building the toroidal blank of the tire.

The process most generally used in order to manufacture a tire for a vehicle wheel consists essentially first of all in applying, one after the other around a cylindrical building drum, the different layers of rubber mixes and the different plies of cords or cables which will constitute the carcass reinforcement of the unvulcanized toroidal tire blank and of the tire itself; said carcass plies being in most cases anchored at each axial end of the drum to an annular metal reinforcement or bead wire.

In the case of a tire having a carcass reinforcement which is formed of plies of bias cords or cables, the second step consists in applying to the central zone of the unvulcanized cylindrical carcass blank the tread reinforcement plies, if any, or tread reinforcement plies, which are formed of cords or cables which are generally crossed from one ply to the next. After the laying of said reinforcement, and the laying of the tread on the latter, the last step in the manufacture of the toroidal blank consists in imparting to it, before vulcanization, the shape of a torus which is very close to that of the finished tire. This operation, which is known as the shaping of the cylindrical blank, is carried out either on a building drum or in the vulcanization mold itself.

In the case of a tire with radial carcass reinforcement, the second step consists in transforming the unvulcanized cylindrical carcass blank by shaping into an unvulcanized toroidal blank, and the last step then consists in placing on the central part of the toroidal blank a tread reinforcement, the layers of rubber mixes necessary and, in particular, the tread.

Despite the care taken in the carrying out of all of the operations described, despite the numerous verifications effected on the starting products, on the semi-finished products, and on the finished toroidal blank, and despite the numerous verifications on the manufacturing machines and the manufacturing steps, the verifications effected on the finished vulcanized tires show the presence of a number of abnormalities with respect to the position of the products, concerning in particular the lower region, for which abnormalities no satisfactory explanations are found. Furthermore, as is known, such processes require, before their assembly, the separate manufacture of the plies of cords or cables by means of large machines and with a large number of operations, and they are therefore expensive.

In order to remedy the above-mentioned drawbacks, that is to say improve the quality of the finished tire and decrease the cost of manufacture of said tire, a new process for the manufacture of a tire is based, in accordance with the present invention, on the principle that the sidewall regions and the bead regions of the blank must be built and handled in the same geometrical configuration as that which they will have in the vulcanization mold.

For the building of a carcass reinforcement, one can use the helicoidal winding of a cord or cable on a foldable and/or disassemblable annular core, followed by a cutting of the torus thus formed and removal of the toroidal reinforcement blank from the building core. Such a manner of manufacture is described in U.S. Pat. No. 1,316,104.

U.S. Pat. No. 3,975,490 describes a method of manufacturing a tire in two or three parts. If the tire is in three parts, two premolded reinforced parts comprise the beads, the sidewalls and the reinforced bands, support of the tread, the third part being the tread itself. This patent mentions the possibility of building the two reinforced parts by winding rubberized woven strips around a toroidal core of circular cross section and separating said blank into two sections by cuts. Enormous difficulties are encountered in producing the reinforcements, in particular of the reinforced bands by winding, in order to effect the cuts of the blank built in this manner and in order precisely to obtain reinforced bands which penetrate into each other after prevulcanization, in order to avoid displacements and deformations upon the handling of the sidewall parts of the tire.

The same is true in French Patent 1 214 908 in which the reinforcement is obtained by winding a layer of rubber mix on a disassemblable mandrel, followed by a layer of steel cables, the width measured between the locations of the metal bead wires being approximately equal to twice the width of each portion of ply necessary in order to be turned up around the anchoring bead wires of the future carcass reinforcement.

German application 1 934 018 describes practically the same process, consisting of helically winding a continuous cord or cable on a form, this winding being cut circumferentially on the radially inner face of the form so as to be able to turn a part of the winding up around the bead wires and thus produce the carcass reinforcement with its turn-ups.

The processes described above use forms, cores or mandrels which may or may not be rigid but are in all cases deformable since they are foldable or disassemblable, and this so that they can be withdrawn from the toroidal reinforcement blanks. In addition to these forms or cores being of difficult and expensive manufacture, they are also difficult to use, since they require a certain handling, which handling results in harmful displacements and deformations of the sidewall and bead regions, which areas, by definition, are the most fragile regions of the unvulcanized tire blank.

Furthermore, these forms or cores do not in all cases assure perfect uniformity of the laying surface and, accordingly, of the shape of the products laid. In fact, the assembly parts of the form are assembled to each other less and less precisely the longer the form has been used. The use of such forms thus results in a lack of uniformity on the vulcanized tire which is just as disturbing as the poor positioning of the products.

SUMMARY OF THE INVENTION

In order to overcome these drawbacks, and in particular to avoid any distortion between the carcass reinforcement blank as it is on the core and as it will be in the vulcanization mold, the process of the invention for producing an unvulcanized toroidal tire blank consists:

a) in covering the said core with at least one layer of rubber mix intended to coat the reinforcement cords or cables;

b) producing a toroidal carcass reinforcement blank by winding a continuous cord or cable around a non-deformable monobloc, non-disassemblable annular core or form having a meridian section the profile of which, at least with respect to its sidewalls, is parallel to the meridian profile of the sidewalls of the innermost carcass reinforcement ply, as it will be in the vulcanization mold;

c) laying the layers and parts of cover rubber mixes of the carcass reinforcement on said blank;

d) circumferentially cutting the carcass reinforcement blank, on the one hand, at least once on the radially inner surface and on the other hand at least once on the radially outer surface of the core;

e) axially separating the two halves of the blank so as to be able to remove the building core, the separation being effected by means which simultaneously grasp, support and handle and have axially inner walls having a meridian profile identical to the meridian profile of the outermost carcass reinforcement ply, possibly covered by the necessary layers and parts of rubber mix, this identity being present at least in the region of the sidewalls, as it is defined above;

f) axially bringing the said halves together and connecting them;

g) completing the tire blank before placing it in the vulcanization mold.

By toroidal carcass reinforcement blank there is to be understood the assembly formed by the cables or cords and the so-called calendering layers intended to coat the cables of cords, said blank being possibly in raw state or in prevulcanized state.

By meridian profile of the sidewalls of the carcass reinforcement ply there is understood the meridian profile of said reinforcement between the points of tangency with the anchoring bead wires and the tread reinforcement respectively.

The grasping, support and handling means of the carcass reinforcement blank are preferably coaxial annular metal shells, some of these so-called sidewall shells being intended for the support, grasping and holding of the sidewalls of the reinforcement formed on the building core, said some sidewall shells being contiguous radially to the outside with two so-called tread shells intended for the support, grasping and handling of the carcass reinforcement crown.

These sidewall and tread shells are provided with suction cavities having valves, the cavities having rubber lips so as not to injure the carcass reinforcement, the latter being then held within the shells by vacuum, i.e. suction.

These means are advantageously applied to the carcass reinforcement blank, built on the core, before the circumferential cuts are effected. The same is true of the placing of the anchoring bead wires of the carcass reinforcement, which is effected by means of the sidewall shells, provided at their bases with recesses intended to receive said bead wires, these recesses being provided on their peripheries with bead-wire holding magnets. With respect to the folding-up of the carcass reinforcement portions intended to constitute the turn-ups of said carcass reinforcement, it is preferably effected after the axial moving apart of the two hands of the blank and the removal of the core. To fold the said portions of carcass reinforcement around the anchoring bead wires means that these portions, which are initially arranged axially to the inside of the anchoring bead wires are arranged, by rotation by 180° around said bead wires, axially to the outside, while remaining parallel to the axis of rotation of the core.

As to the joining of the two halves of the blank, it can be effected by the contribution of at least one additional reinforcement ply covering the two edges of the carcass reinforcement or by simple abutment of the two ends or by overlapping one of the two upper edges of the carcass reinforcement over the other or else by an overlapping, by at least one ply, of the edge-to-edge junction or the overlapping of both edges.

The folding of the portions of the carcass reinforcement intended to constitute the turn-ups of said reinforcement is followed by the holding in horizontal position of these turn-ups, this holding being advantageously effected either by suction or by means of suction cavities placed below the inner faces of the sidewall shells, or, in the absence of said shells, by the presence of two coaxial drums, the axial distance between the axially inner faces of which may be variable.

It is advantageous, in accordance with the invention, for the laying of the tread reinforcement and the tread to be effected by means of a prefabricated complex formed of two elements. Likewise, the laying of said complex on the crown of the carcass reinforcement blank is preferably effected while the sidewalls of the carcass reinforcement are still held by the so-called sidewall shells, this holding permitting perfect stability of the carcass reinforcement and of the anchoring bead wires during the course of the manufacturing process.

The same is true of the laying of the layers and parts of rubber mixes intended to form the inside of the tire, the layers and/or parts arranged axially and radially to the inside of the calendered carcass reinforcement, this laying being preferably effected while the sidewall shells are held in place on the carcass reinforcement.

DESCRIPTION OF DRAWINGS

The invention will be better understood from the accompanying drawing which shows non-limitative embodiments, in which drawing.

DESCRIPTION OF PREFERRED EMBODIMENTS

Figure 1:
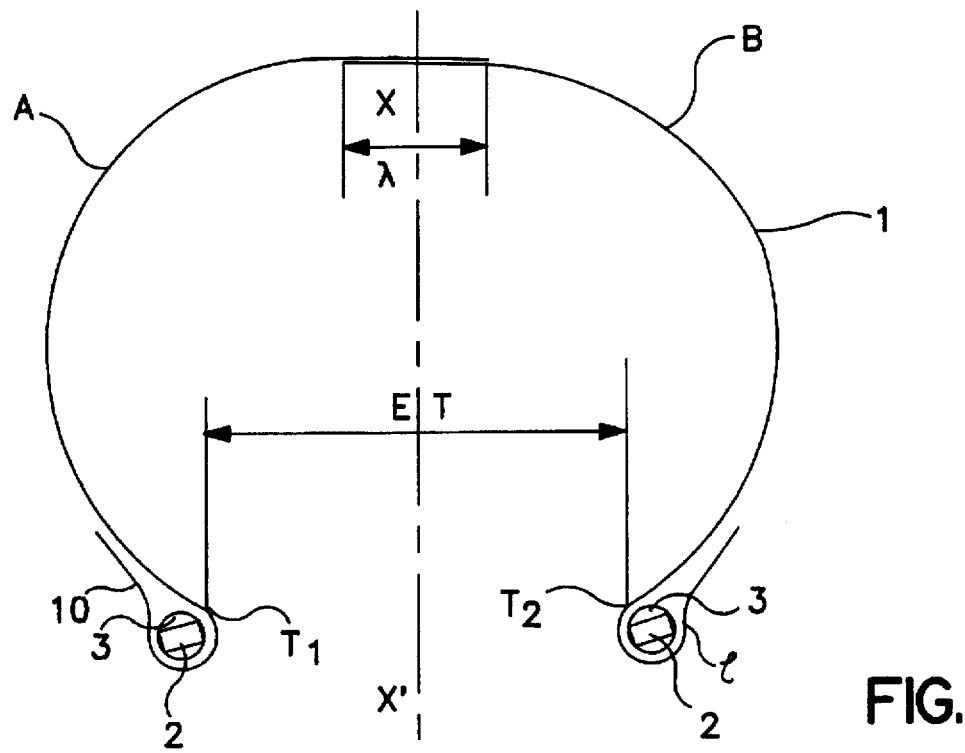
FIG. 1 shows a first variant of the blank of the carcass reinforcement as seen in meridian section in the vulcanization mold.

FIG. 1 shows a meridian cross section through the carcass reinforcement 1 of a tire which is to be manufactured, this meridian section being seen in the vulcanization mold of the tire. The carcass reinforcement 1 is formed of two parts which overlap at the level of the equatorial plane XX' of the tire along an overlap width λ. The meridian profile of the reinforcement 1 can be broken down into three fundamental parts: a median part AB of small transverse curvature, in which the meridian profiles of the carcass reinforcement 1 and of the tread reinforcement (not shown) respectively are parallel to each other, the points A and B being precisely the points of tangency of the meridian profile of the carcass reinforcement with the meridian profile of the tread reinforcement. From points A and B to the points of tangency T1 and T2 of the reinforcement 1 with the assemblies formed of the bead wires 2 which anchor said reinforcement 1 and of the layers 3 of vulcanized rubber mix arranged around the bead wires 2 so that the meridian sections of the assemblies are substantially circular, the carcass reinforcement has a meridian profile which is specific to it and the transverse curvature of which, which is definitely larger, corresponds to the sidewalls of the tire.

This carcass reinforcement 1 is turned up in each bead around the assembly consisting of the bead wire 2 and the coating 3 so as to form the turn-ups 10. The bead wires 2 will be separated in the vulcanization mold by an axial distance referred to as "inter-bead wire" ET and the curvilinear length between the point $T_1$ and the end of the turn-up 10 is 1.

Figure 2:
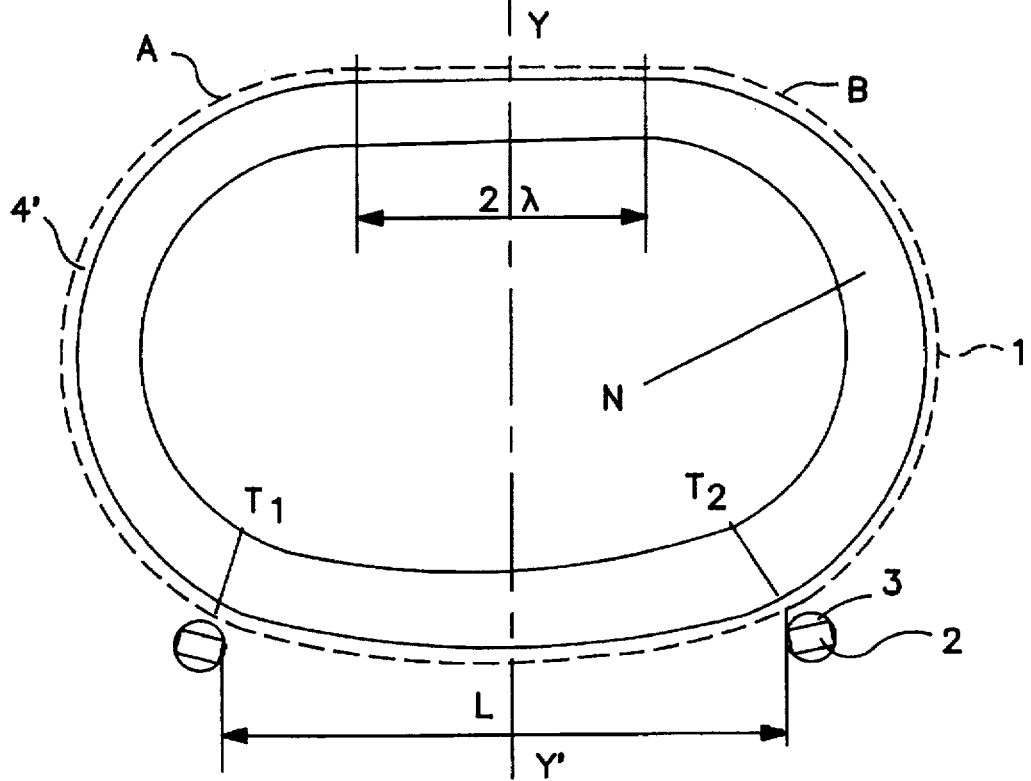
FIG. 2 shows the carcass reinforcement blank of FIG. 1, seen in meridian section on the building core.

FIG. 2 shows the core N necessary in order to manufacture the toroidal blank of the carcass reinforcement 1 such as described above. This core N is a closed metallic hollow torus the thickness of the wall of the torus being such that it is practically non-deformable. The outer meridian profile of the core N, which is advantageously covered by a layer of non-sticking fabric, is, taking into account the thickness of the fabric and the thickness of the layer of rubber mix 4' covering the cables of the carcass reinforcement 1 on the inside and laid on said core, parallel to the meridian profile of said reinforcement, such as shown in FIG. 1, from the radially upper face of the core N to the points of tangency $T_1$, $T_2$ of the bead wires with the reinforcement, the two points $T_1$ and $T_2$ being then axially spaced apart by the amount L equal to ET+2λ. The carcass reinforcement blank 1 is obtained by winding a cord or cable around the covered core N, the core resting on support and rotation rollers, while a cord or cable distributing device permits the feeding of the cable and its winding around the core which turns at a given speed. Such a winding process and the device for the carrying out thereof are known and reference may be had, for instance, to French patent 2 052 885.

Figure 3:
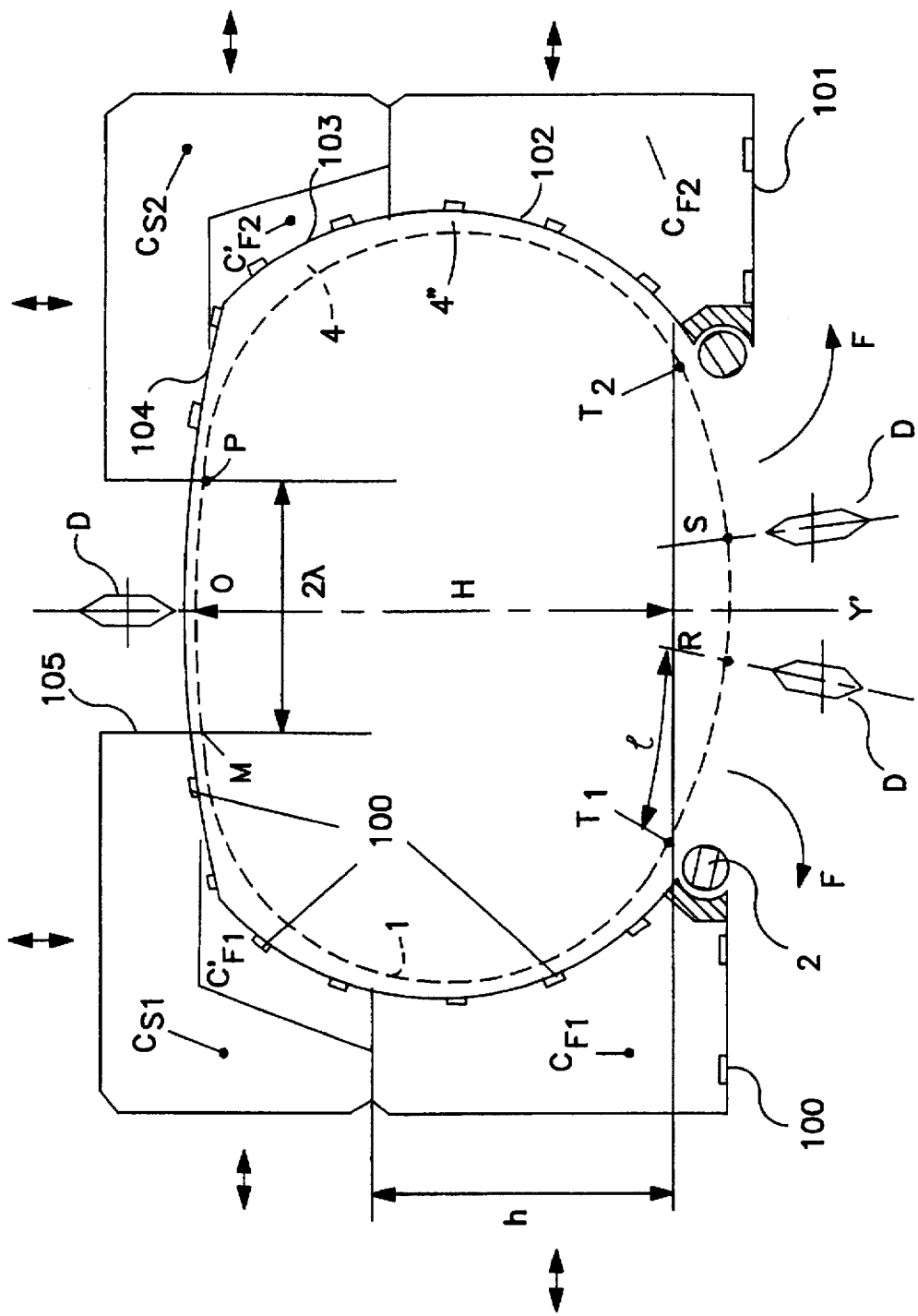
FIG. 3 shows the carcass reinforcement blank of FIG. 2 on which grasping, handling and support means have been placed.

As shown in FIG. 3, the toroidal carcass reinforcement blank 1 is covered with a layer of rubber mix 4" intended to cover the outside of the cables of said reinforcement 1, shaped parts of rubber mix 4 which are normally located between the carcass reinforcement 1 and the tread reinforcement as well as the different layers of rubber reinforcing mix.

The toroidal blank which is covered in this manner is then clamped against the core N in its sidewall parts and in its tread part, with the exception of the width 2λ around the equatorial plane YY' (FIG. 2) by two metallic sidewall primary circular shells $C_{F1}$ and $C_{F2}$, said shells being connected radially to two secondary sidewall circular shells $C'_{F1}$ and $C'_{F2}$, the latter being in their turn connected to two tread circular shells $C_{S1}$ and $C_{S2}$, also of metal.

The connecting line of the shells $C_{F1}$ and $C'_{F1}$ and $C_{F2}$ and $C'_{F2}$ respectively is located radially substantially at a distance h from the imaginary line axially connecting the points of tangency $T_1$, $T_2$, h being substantially equal to 0.75 H, and H being the height of the toroidal carcass blank 1 measured from the same imaginary limit $T_1$, $T_2$. The upper connecting line of the shells $C'_{F1}$ and $C_{S1}$ and $C'_{F2}$ and $C_{S2}$ respectively is substantially parallel to the axis of the building core N and located at a radial distance from said axis substantially equal to the radial distance between the point A and B, of the carcass reinforcement 1 of the tire in the mold, from the axis of rotation of said mold.

These sidewall shells $C_{F1}$, $C_{F2}$, $C'_{F1}$ and $C'_{F2}$ and these tread shells $C_{S1}$, $C_{S2}$ have axially inner faces the meridian profiles of which correspond precisely to the meridian profile of the carcass reinforcement blank 1 covered with the various layers of rubber mixes. The sidewall shells $C_{F1}$ and $C_{F2}$ are provided at their axially and radially inner ends with circular cavities intended to receive the assemblies consisting of bead wires 2 and rubber coatings 3, these assemblies being placed in contact with the carcass reinforcement 1 laid on the core N upon the axial displacement of the shells $C_{F1}$, $C_{F2}$ towards the core N.

The carcass reinforcement 1, in unvulcanized condition in the example described, and the bead-wire assemblies being held strongly in place, the carcass reinforcement 1 is cut by rotary knives D on the one hand on the radially upper face at the place of the equatorial plane YY' of the core and on the other hand on the radially inner face of the core at two points R and S such that the distances $T_1R$ and $T_2S$ are equal to the curvilinear length 1 measured on the vulcanized tire, the part RS being removed from the core N.

The next step in the process of the invention consists then in axially moving away the shell assemblies $C_{F1}$, $C'_{F1}$, $C_{S1}$ and $C_{F2}$, $C'_{F2}$, $C_{S2}$, the axially and radially inner faces 101, 102, 103, 104 of said shells being provided with suction cups 100 permitting the holding and transporting by suction of the carcass reinforcement blank 1, without any change in the meridian profile of said blank. The suction cups 100 are, as known, connected to an air pump which can create a vacuum in said suction cups.

As indicated by the arrows F in FIG. 3, the parts $T_1R$ and $T_2S$ are then turned up around the assemblies consisting of bead-wires 2 and coatings 3 so as to come against the radially inner faces 101 of the sidewall shells $C_{F1}$ and $C_{F2}$, the turn-ups 10 being also held by suction.

The axial distance between the sidewall and tread shells having permitted the removal of the building core N, the inner finishing of the tire as well as that of the beads is then possible. It is thus that the different layers of rubber mix generally forming the inner layers of the tire, such as the reinforcement layers, or the air-impervious layer of mix in the tubeless tire are laid.

There are also laid the small reinforcement plies, known as cord or cable stiffeners or tongues 12, which are usually arranged axially to the outside of the carcass reinforcement turn-ups in the finished tires, as well as all the layers of rubber 13 necessary for the forming of the beads, arranged to the outside of the turn-up of the carcass reinforcement 1. All these layers of rubber are advantageously laid in accordance with the technique described in French Patent 2 603 841 of the same applicant.

As can be noted in FIG. 3, the portions MO and OP of the carcass reinforcement blank, after being cut at O, are not held by the tread shells. These two portions, each of width λ, form, during the axial movement together of the shells, the carcass reinforcement overlap such as shown in FIG. 1.

Figure 4:
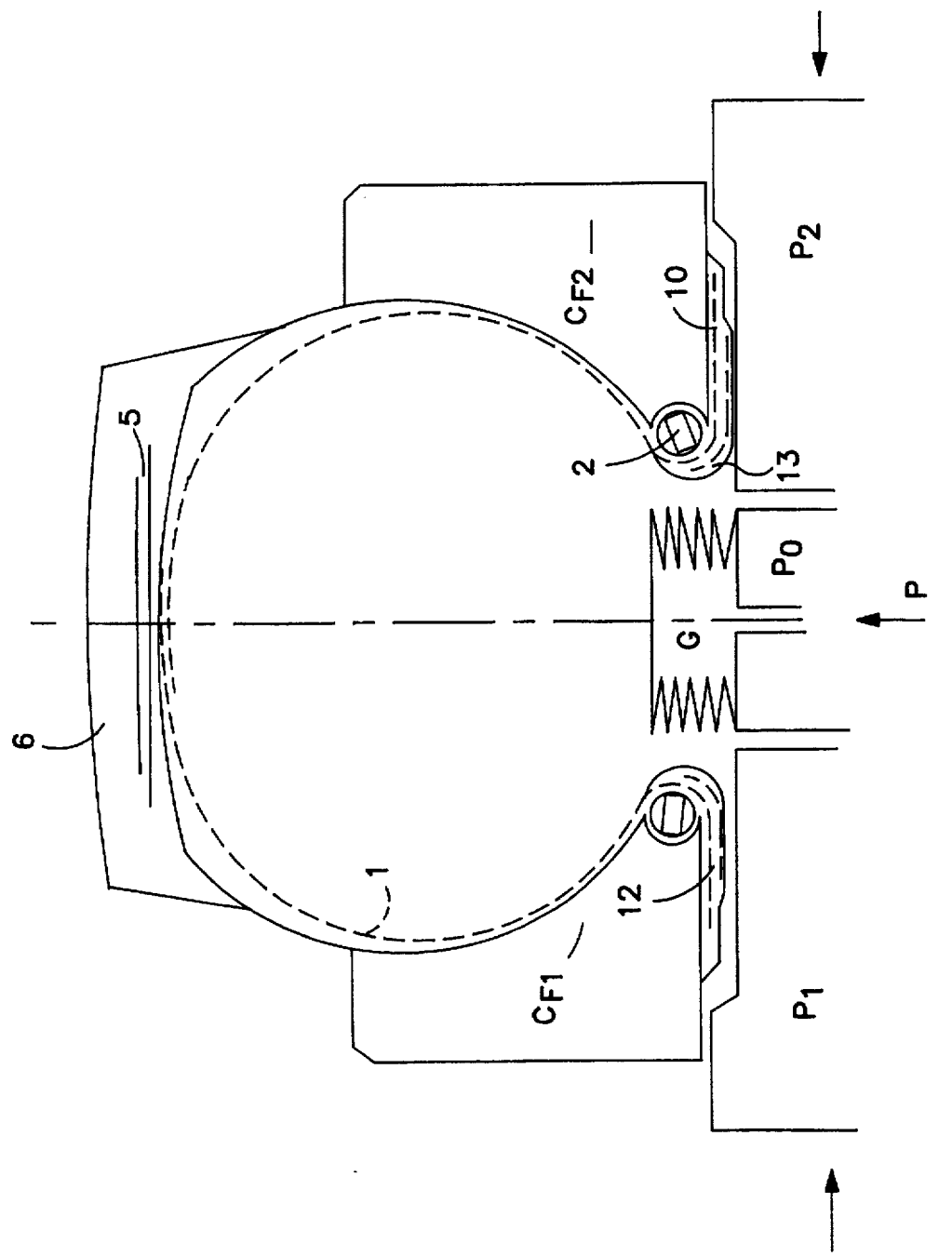
FIG. 4 shows the carcass reinforcement blank after connection of the upper parts of said reinforcement and the laying of the complex consisting of the tread reinforcement and tread.

The overlap being produced, the carcass reinforcement blank 1 is then placed under pressure p through an inflation member G fastened on a drum $P_o$. This membrane G is advantageously reinforced at the top in such a manner as to have the rigidity suitable for the laying of a prefabricated assembly formed of the tread reinforcement 5 and the tread 6 after the axial and radial moving apart of the two tread shells $C_{S1}$ and $C_{S2}$ and of the sidewall shells $C'_{F1}$ and $C'_{F2}$ (FIG. 4). Simultaneously with the moving away of $C_{S1}$ and $C_{S2}$, two inflatable drums $P_1$, $P_2$ are brought axially onto opposite sides of the drum $P_o$, the drums $P_1$ and $P_2$ having the object of holding in position the assemblies formed by the bead wires 2, their coatings 3, the turn-ups 10, the reinforcements 12, and all the surrounding mixes 13, which holding in position will be necessary for the external finishing of the sidewalls and beads of the tire after the axial moving apart of the sidewall shells $C_{F1}$ and $C_{F2}$. This finishing then consists in laying the layers and parts of rubber mixes 14, 15, located in the vulcanized finished tire between the carcass reinforcement 1 and the turn-up 10, as well as the layers and parts of mixtures 7' and possible ply reinforcement 70, which are located on the sidewalls of the carcass reinforcement, the finishing being completed by the laying of the parts of the outer sidewall layers 7".

Figure 5:
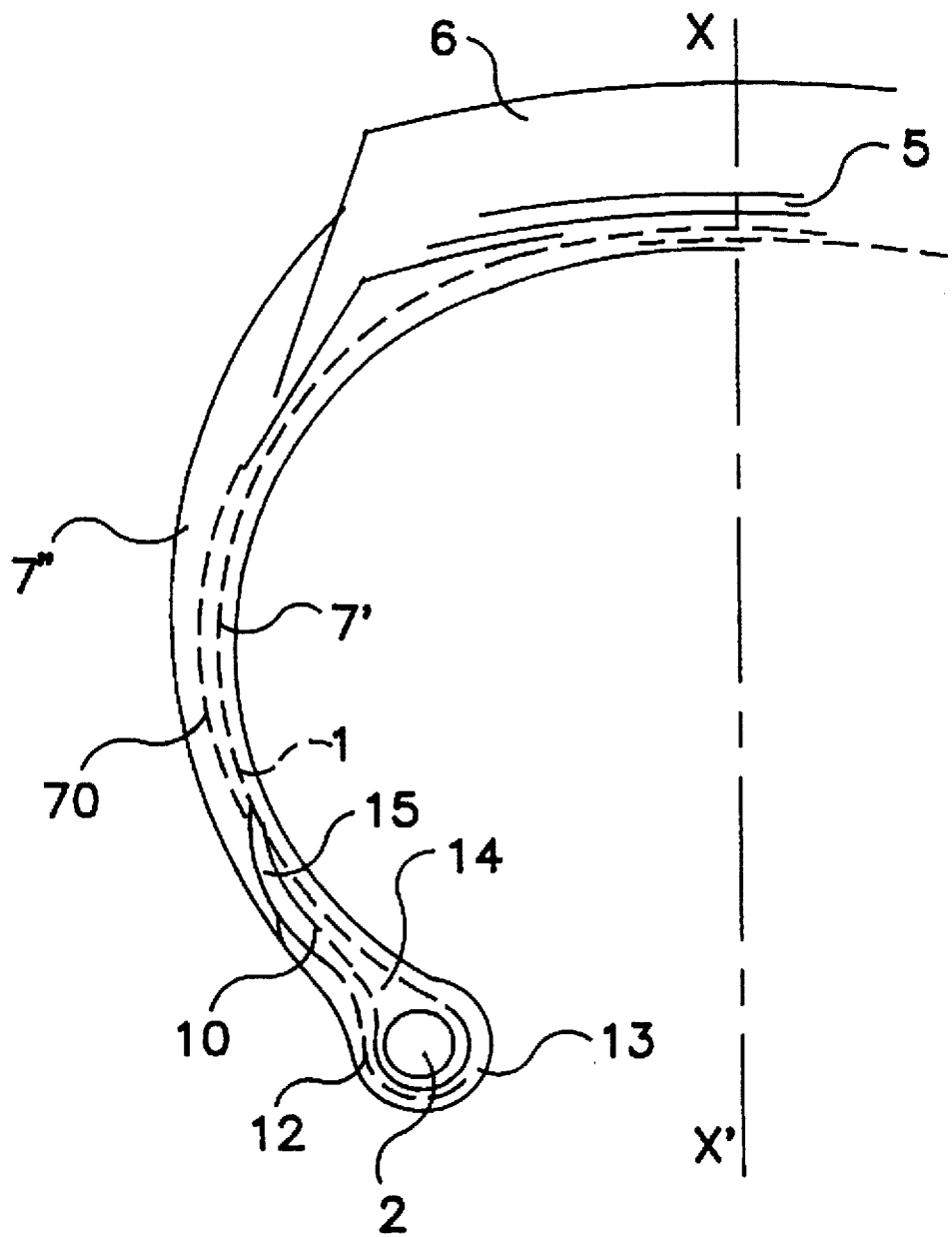
FIG. 5 shows the finished tire blank before placing in the vulcanization mold.

The tire blank is thus ready for vulcanization (FIG. 5).

Figure 6:
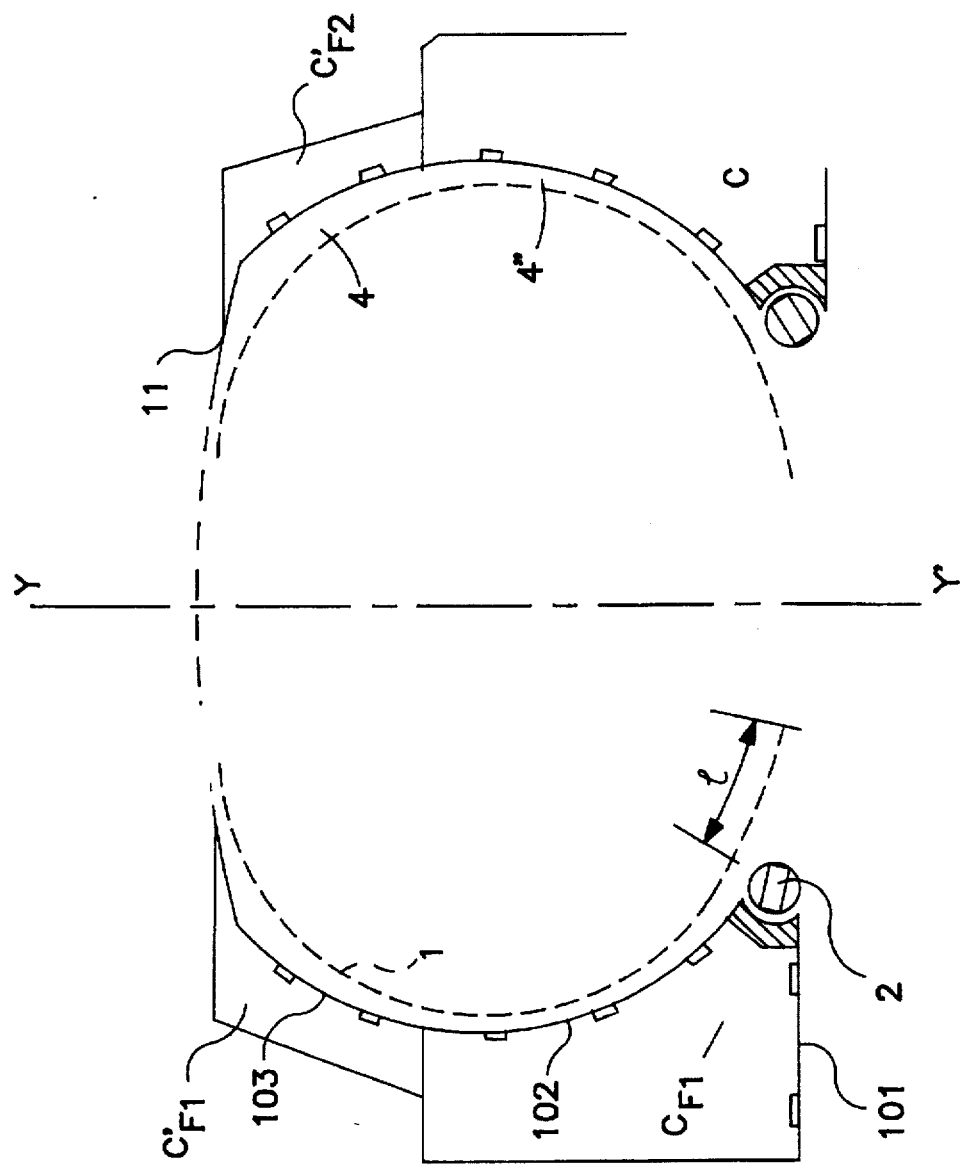
FIG. 6 shows a second variant of the carcass reinforcement blank on which the sidewall grasping, handling and supporting means are placed.

The example described above corresponds fundamentally to a process intended for obtaining a tire the two carcass reinforcement halves of which overlap in the upper part. One can, however, conceive of the dimensions of the core being imposed by the length of turn-up 1 of the carcass reinforcement around the bead wires 2, and the building core N will be such that the axial distance L between the bead wires laid corresponds, as a function of the curvatures of the lower face of the core, to the sum of the turn-up lengths 1. It is then possible that, the tire in the vulcanization mold having an axial distance between bead wires ET greater than L, to obtain, after a single cut on the radially inner face of the core and a single cut on the radially outer face of the core, a space where the carcass reinforcement is missing. As shown in FIG. 6, the process consists then, after axial moving apart of the two halves of the blank and removal of the two tread shells $C_{S1}$ and $C_{S2}$ in laying an additional reinforcement ply 11 on and between the two upper edges of the carcass reinforcement 1.

This additional ply 11 can be formed of radial cords or cables, that is to say cords or cables which form an angle of 90° with the circumferential direction, or cords or cables which are oriented at an angle of between 60° and 90° with respect to said direction.

After the laying of said ply, it is possible, as in first example described, to complete the blank by the laying of a tread reinforcement and of a tread, or of the prefabricated assembly of the two parts after the axial moving apart of the secondary sidewall shells $C'_{F1}$ and $C'_{F2}$.

I claim:

1. A process for manufacturing a tire having a carcass reinforcement formed of at least one ply comprising helically winding a cord or cable around a non-deformable, non-disassemblable annular monobloc core having a meridian section the profile of which, in its sidewall and bead portions, is parallel to the meridian profile of the innermost carcass ply as it is in the vulcanization mold for the tire, circumferentially cutting the at least one ply of carcass reinforcement to obtain two blank halves, separating axially the two blank halves by moving apart coaxial metal shells having inner walls with means for grasping, supporting and handling the carcass reinforcement in the region of the sidewalls and which inner walls present a meridian profile of the outermost carcass reinforcement ply, the axial separation permitting removal of the core, and displacing the two blank halves axially towards each other for connection after removal of the core.

2. A process according to claim 1, characterized by the fact that the two blank halves are connected by means of axial overlapping of the upper edges of the carcass reinforcement (1) over an axial width λ.

3. A process according to claim 1, characterized by the fact that the two blank halves are connected by means of at least one additional ply, formed of cords or cables inclined with respect to the circumferential direction of the blank by an angle α such that $90° \geq \alpha \geq 60°$, and laid on and between the two upper edges of the carcass reinforcement.

4. A process according to claim 1, characterized by the fact that as support, grasping and handling means there are used coaxial annular metal shells, four of these shells, referred to as sidewall shells $C_{F1}$, $C_{F2}$, $C'_{F1}$, $C'_{F2}$ being intended for the grasping and support of the sidewalls of the torus formed on the core, two of said sidewall shells $C'_{F1}$ and $C'_{F2}$ being joined radially to the outside to two so-called tread shells $C_{S1}$, $C_{S2}$ intended for the grasping and support of the crown of the torus.

5. A process according to claim 4, characterized by the use of shells $C_{F1}$, $C_{F2}$, $C'_{F1}$, $C'_{F2}$, $C_{S1}$, $C_{S2}$ provided with suction cavities (100) having valves, these cavities having rubber lips.

6. A process according to claim 4, characterized by the fact that the primary sidewall shells $C_{F1}$, $C_{F2}$ have their bases provided with recesses intended to receive bead wires (2) for the anchoring of the carcass reinforcement (1), these recesses being provided with magnets for the holding of the bead wire (2).

7. A process according to claim 6, including folding portions of the carcass reinforcement blank around the anchoring bead wires (2) after axial moving apart of the two halves of the blank and holding the folded portions below radially inner faces (101) of the sidewall shells $C_{F1}$, $C_{F2}$ by vacuum by means of suction cavities (100) to complete the building of the beads by the laying of reinforcement and/or rubber mix layers arranged radially to the inside of the foldings.

8. A process according to claim 7, characterized by the fact that the finishing of the tire blank comprises, in chronological order, the following steps:

laying on the upper part of the carcass reinforcement blank a prefabricated complex comprising a tread reinforcement (5) and a tread (6), after removal of the tread shells $C_{S1}$, $C_{S2}$, and the secondary sidewall shells $C'_{F1}$, $C'_{F2}$, and the placing of the blank under pressure;

putting cylindrical inflatable holding drums in place, below the folded portions of the reinforcement blank which are intended to form carcass reinforcement turn-ups and surrounding reinforcement and/or rubber mix layers;

axial moving apart of the sidewall shells $C_{F1}$, $C_{F2}$;

finishing of the beads of the tire by the laying on the reinforcement blank rubber mixes arranged in the tire between the carcass reinforcement and its turn-up, by complete turning-up of the folded portions;

finishing of the sidewalls of the tire by the laying of layers of rubber mixes arranged in the sidewalls of the tire axially to the outside of the carcass reinforcement.

9. A process according to claims 4, characterized by the fact that the support, grasping and handling means are applied to the blank before the effecting of the circumferential cuts.

10. A process according to claim 9, characterized by the fact that the application of the anchoring bead wires on the layer of cords or cables wound around the core N is effected simultaneously with the application of the support, grasping and handling means.

11. A process according to claim 1, including application of reinforcement and/or rubber mix layers inside the carcass reinforcement and application of an impermeable inner layer of mix after the axial moving apart of the two halves of the carcass blank.

* * * * *

UNITED STATES PATENT AND TRADEMARK OFFICE
CERTIFICATE OF CORRECTION

PATENT NO. : 5,700,339
DATED : Dec. 23, 1997
INVENTOR(S) : Billieres

It is certified that error appears in the above-indentified patent and that said Letters Patent is hereby corrected as shown below:

<u>Col. 5, line 24</u>, "ET + 2$\lambda$" should read --ET + $\lambda$--.

<u>Col. 8, line 45</u>, "turn-up" should read --turn-ups--.

Signed and Sealed this

Sixteenth Day of June, 1998

*Attest:*

BRUCE LEHMAN

*Attesting Officer*   *Commissioner of Patents and Trademarks*